Patented June 18, 1940

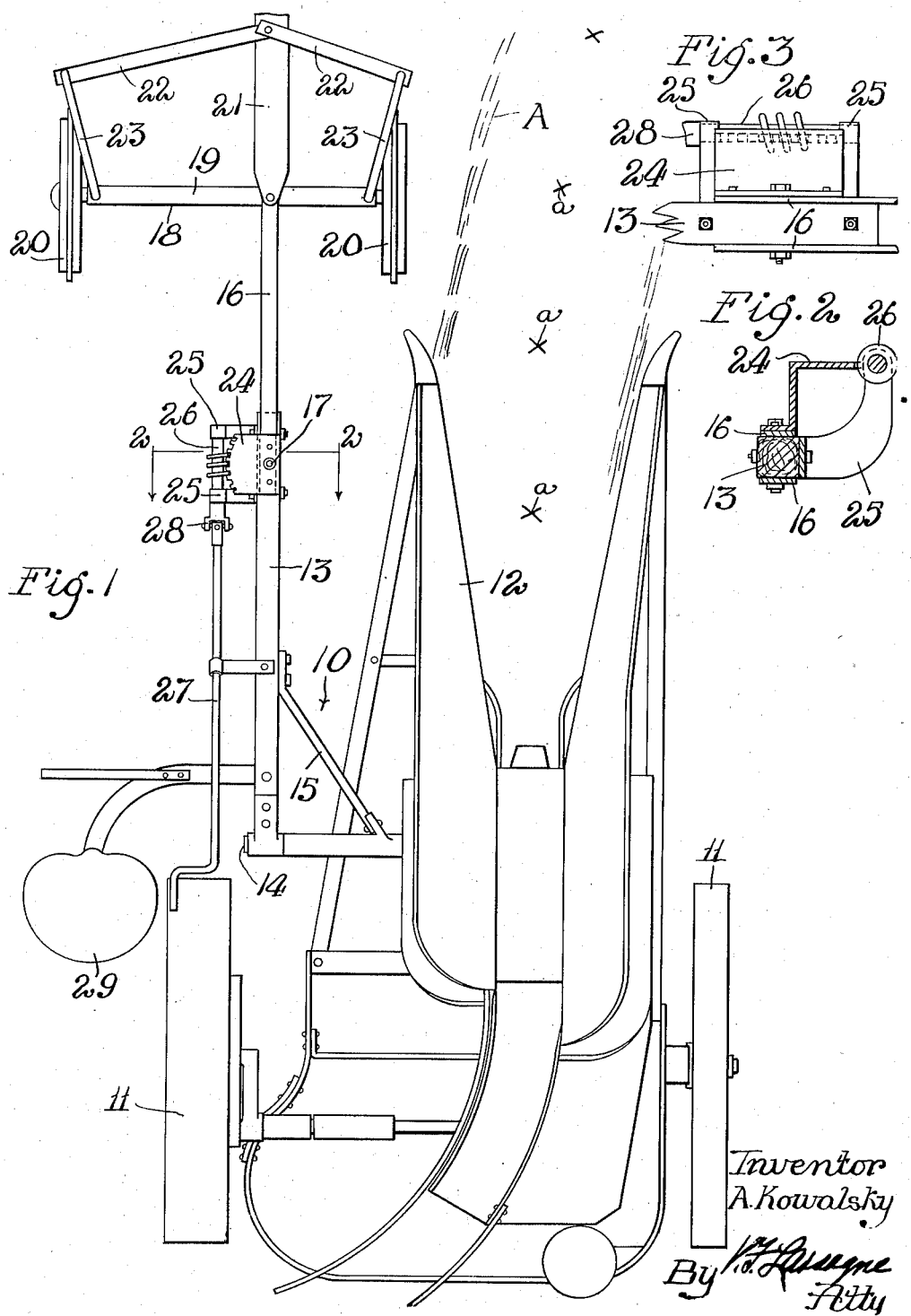

2,204,682

UNITED STATES PATENT OFFICE 2,204,682

HARVESTER

Andrew Kowalsky, Oak Park, Ill., assignor to International Harvester Company, a corporation of New Jersey Application October 21, 1938, Serial No. 236,284

4 Claims. (Cl. 56—218)

This invention relates to a harvester, and more particularly to steering mechanism therefor associated with the frame for guiding the harvesting part of the machine when operated over fields planted in rows.

A major difficulty confronting the operation of row-crop harvesters has been encountered when the rows in the field over which the harvester is to be operated are not substantially straight or are otherwise out of line. This condition may be the result of faulty planting or conditions of the soil or ground contour. Since most harvesters are of substantial lengths, it is difficult to steer the rear ends thereof through the medium of guiding the horses or tractors to which the harvesters are attached. For this reason, suitable guiding means must be provided on the harvester itself, which means are preferably adapted to be operated by an operator situated at some point on the harvester.

The principal object of the present invention, then, is to provide a suitable guiding means for the aforesaid purpose, and another object is to provide suitable control means for the steering means, which may be operated by an operator situated on the harvester.

The foregoing objects are attained by providing a harvester frame comprising a pair of frame parts interconnected for relative lateral movement, one of the parts being connected to the rear frame portion of the harvester, which is supported on the comparatively large rear ground wheels, and by locating the steering or guiding means substantially at the point of interconnection of the frame members and between the rear ground wheels and a steerable front truck, which supports the forward frame part.

Briefly and more specifically, the foregoing and other important objects of the invention are achieved in one preferred form of the invention in which a row-crop harvester of the binder type is provided with suitable draft or frame elements extending longitudinally of the harvester and substantially at right angles to the axis of the rear ground wheels. These draft or frame parts are pivotally interconnected for relative lateral movement about a vertical axis and the forward end of the forward frame part is supported on a steerable front truck, which is adapted to be connected by a draft device to a source of power. A worm and sector device is associated with the frame parts substantially at the point of interconnection therebetween and is provided with control means operable from an operator's station mounted on the harvester frame proper. This steering or guiding means normally holds the harvester frame in position along the line of draft and may be easily and readily adjusted from the operator's station to shift the relative lateral positions of the frame parts to guide the rear ground wheels of the harvester, thus compensating for irregularities in the rows in the field over which the harvester is operated.

A more complete understanding of the objects and desirable features of the invention may be had from the following detailed description taken in conjunction with the accompanying sheet of drawings, in which:

Figure 1 is a plan view of a harvester embodying the invention;

Figure 2 is a transverse sectional view of the steering means taken substantially along the line 2—2 of Figure 1; and, Figure 3 is an enlarged side elevational view of the steering means.

The row-crop harvester chosen for the purposes of illustration is of the type commonly known as a binder and comprises generally a frame 10 carried at its rear by a pair of laterally spaced rear ground wheels 11. Longitudinally extending picking or harvesting means, generally shown at 12, extends forwardly from and between the wheels 11 longitudinally of the frame 10. As is well known to those skilled in the art, machines of this type are adapted to operate over fields in which the growing crops have been planted in rows. Such a row has been generally indicated in Figure 1 at A, with plants or crops in said row being indicated at a. In the present showing, there has been illustrated a portion of a row, which, because of some circumstance or condition, is not straight, or is otherwise out of line.

The frame 10 comprises a forwardly extending frame part or draft member 13, which is pivotally connected about a transverse horizontal axis to the frame proper, as at 14. A suitable brace 15 is secured between the frame and the frame part 13 to prevent relative lateral movement between these two parts. A second frame part or tongue 16 is movably interconnected with the frame part 13, preferably about a vertical axis 17, about which the parts may have relative lateral movement. The second or forward frame part 16 is rigidly connected at its forward end to a steerable front truck 18, generally comprising a transverse bolster 19 carried on a pair of steerable wheels 20. A draft device or member 21 is pivotally connected by a pivot pin 21a to the front truck 18 and is provided with cross links 22 connected to steering arms 23 for effecting steering of the wheels 20. The member 21 is pivotable relative to the bolster 19 and member 16, but there is no pivotal movement between the member 16 and the bolster 19, in view of the auto-type steering means here employed.

In order to guide the harvester suitably over the field under circumstances involving such curved rows as illustrated at A in Figure 1, steering or guiding means have been provided, and the association of this means with the harvester frame parts 13 and 16 forms an important part of the present invention.

The draft device 21 is adapted to be connected to a source of draft power, such as a horse or a tractor, and, when the harvester is operated over the field, the member 21 and frame parts 13 and 16 are substantially in longitudinal alinement, or, stated in another way, disposed generally along the line of draft. With the harvester operating in this position, the rear wheels 11 follow the line of draft as does the picking means 12, and, unless the horse or tractor is steered, the picking means 12 will follow in a straight line and will pick or harvest crops planted along a straight row. When the row is curved or otherwise out of line, steering of the horse or tractor is of little avail because of the distance between the effective portion of the picking means and the source of draft power.

A suitable steering means has been provided by the present invention and preferably comprises a sector 24 rigidly carried at the rear end of the frame part or tongue 16. This sector 24 extends upwardly and laterally from the part 16 and has a toothed portion thereof disposed in a horizontal plane, as best shown in Figure 2. Further, as best shown in Figure 2, the rear frame part 13 is provided with a pair of longitudinally spaced brackets or arms 25 in which is rotatably carried a worm 26, which cooperates with the toothed sector 24, as will hereinafter appear. A control means in the form of a longitudinally extending crank 27 is suitably connected by a universal joint 28 to the worm 26. An operator's station 29 is carried by the frame 10, and the crank 27 extends within easy reach of an operator mounted on the station.

The cooperation between the worm 26 and the sector 24 positively and normally holds the frame parts 13 and 16 in position substantially along the line of draft, as hereinbefore noted. When the picking or harvesting means 12 approaches a curved part of a row, which is easily viewed by an operator from the station 29, the crank 27 may be operated and the position of the sector 24 thus changed, causing relative lateral shifting between the parts 13 and 16 about the vertical axis 17. Since the frame part 13 is laterally immovable with respect to the frame 10, it follows that the rear part of the harvester, from the point 17 back, must accordingly be shifted laterally, and thus the rear wheels 11 are guided to guide the entire harvester to compensate for changes in the row. Steering of the harvester is easily effected by means of the steerable truck 18. Compensation for side draft may be made through the medium of steering the front wheels 20 by means of the steering linkage provided.

When the harvester is drawn by horses, the particular mounting of the frame parts with respect to the harvester and the tongue truck simplifies and makes easier the steering and guiding of the picking or harvesting means 12. The provision of the front truck 18, of course, removes the weight of the entire harvester from the horses and enables them to be more easily guided by the operator of the machine.

From the foregoing description, it will be seen that a new and improved harvester organization has been provided, into which a desirable steering or guiding means has been incorporated. It will be appreciated, of course, that numerous modifications and alterations may be made in the form and operation of the preferred construction disclosed without departing from the spirit and scope of the invention as defined in the appended claims.

What is claimed is:

1. In a row-crop harvester having a wheeled frame and an operator's station thereon, the combination therewith of a draft member rigidly connected to the frame against relative lateral movement and extending from the frame substantially along the line of draft, a tongue pivotally connected at one end to the draft member for relative lateral movement and extending substantially along the line of draft, a wheeled truck supporting the tongue at its other end, a toothed member secured to the tongue substantially at the pivotal connection between the tongue and draft member, a worm movably carried by the draft member and associated with the toothed member for normally holding the tongue and draft member substantially along the line of draft, and a control means extending within the vicinity of the operator's station and connected to the worm, said means being operable to adjust the lateral position of the draft member with respect to the tongue for guiding the wheeled frame through the rows.

2. In a row-crop harvester having a frame carried on a pair of laterally spaced wheels and adapted to be drawn over a field planted in rows, a wheeled truck disposed ahead of the frame, and a draft member extending substantially along the line of draft and rigidly connected at one end to the frame against lateral movement relative thereto and connected at its other end to the truck, said draft frame comprising two parts pivotally interconnected on a vertical axis intermediate the aforesaid points of connection, and means normally holding said parts in position along the line of draft, said means being operable to adjust the positions of said parts about the vertical axis at the point of interconnection.

3. In a row-crop harvester, a frame carried at its rear on a pair of laterally spaced wheels and at its front on a wheeled truck, said frame including a pair of longitudinally extending frame elements movably interconnected for relative lateral movement between the rear wheels and the front truck, a draft device associated with the truck, and adjustable means associated with the frame elements substantially at their point of interconnection, said means normally maintaining said elements in position along the line of draft and being adjustable to move said elements laterally.

4. In a row-crop harvester, a two part longitudinal frame pivotally interconnected for relative lateral movement about a vertical axis, the rearward frame part being carried by a pair of rear ground wheels and the forward frame part being carried by a front truck associated with a draft device, and adjustable means associated with the frame parts normally holding said parts in substantially longitudinal alinement, said means being operable to adjust said parts laterally to guide the rear ground wheels.

ANDREW KOWALSKY.